March 26, 1957  P. V. TARR  2,786,726
SINTERED POWDERED METAL ROTARY BEARING
Filed Oct. 25, 1954
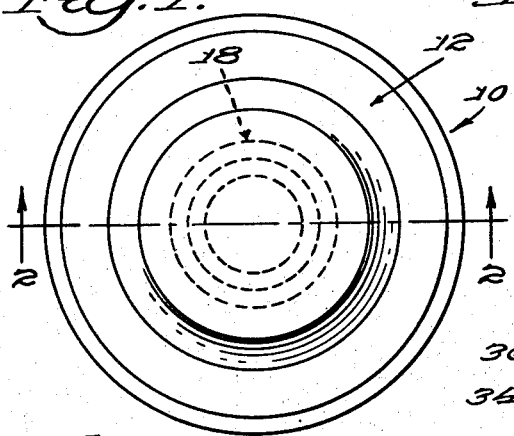
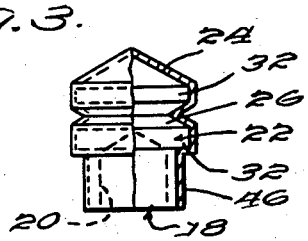
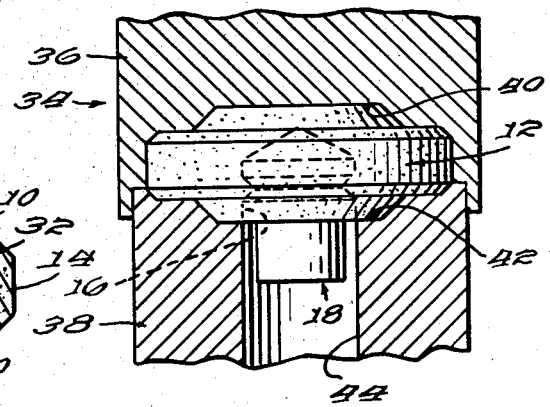
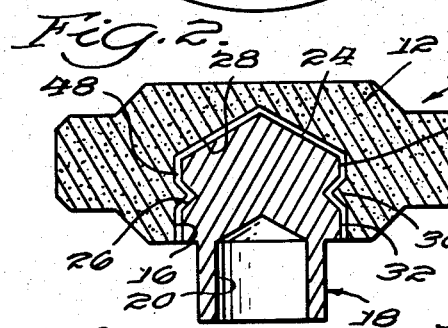
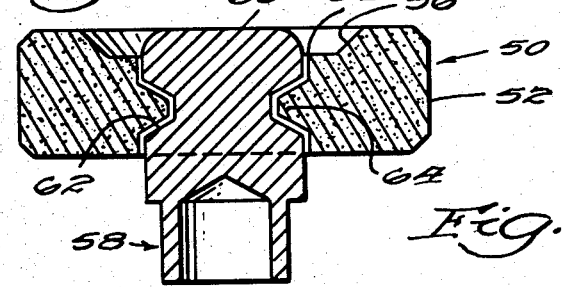
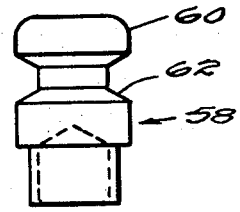
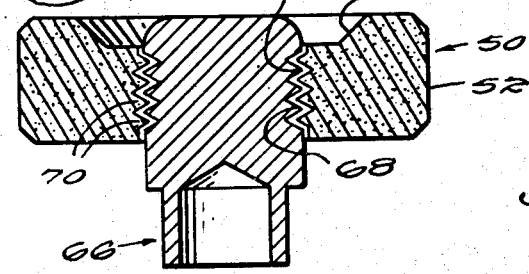
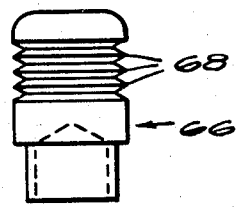
INVENTOR.
Philip V. Tarr.
BY Thomas P. Mahoney.
Atty

United States Patent Office 2,786,726
Patented Mar. 26, 1957

2,786,726

SINTERED POWDERED METAL ROTARY BEARING

Philip V. Tarr, Anaheim, Calif., assignor to Kwikset Locks, Inc., Anaheim, Calif., a corporation of California Application October 25, 1954, Serial No. 464,473

1 Claim. (Cl. 308—106)

This invention relates to a powdered metal rotary bearing and, more particularly, to a powdered metal rotary bearing having both radial and thrust bearing characteristics.

There are many applications wherein shaft mounted rollers can be advantageously utilized, such as in guides for file cabinet drawers and for shelving of various types. Since side loads are frequently encountered in such applications, it is desirable that the rollers utilized be capable of sustaining both radial and thrust loads. Due to the fact that such rollers are frequently utilized in inaccessible locations, or in locations which are not easily accessible, the problem of lubricating conventional rollers is a considerable one and lack of lubrication frequently causes the failure of the rollers.

It is, therefore, an object of my invention to provide a sintered powdered metal roller which provides both the desired radial and thrust bearing characteristics and which includes a roller formed from sintered powdered metal and encompassing a supporting steel shaft upon which the roller is mounted. Because of the porosity of the powdered metal roller, it can be soaked in lubricant to insure the proper lubricating of the roller and the shaft over long periods of time, thus substantially reducing the lubricating problem encountered in conventional roller constructions.

Another object of my invention is the provision of a construction of the aforementioned character wherein the shaft and the powdered metal roller have interengaging thrust bearing surfaces, said thrust bearing surfaces being capable of sustaining any axial loads to which the roller may be subjected.

Another object of my invention is a two-piece construction which eliminates many of the assembly and fabricating problems encountered in the manufacture of conventional rollers of the type under consideration herein and which can also be easily and cheaply incorporated into the structure in which it is to be utilized.

A further object of my invention is the provision of a method of fabricating a sintered powdered metal roller journaled upon a steel supporting shaft which includes the following steps: insertion of the shaft in a die, charging of the die with a controlled amount of metal powder, subjecting the charge of powdered metal to the desired pressure, removing the molded roller and shaft from the die, and heating the molded assembly to sintering temperature in order to form the roller body about the aforementioned shaft.

Another object of my invention is the provision of a method of the aforementioned character wherein a thrust bearing surface is provided upon the periphery of the shaft and a mating thrust bearing surface is formed in the bore of the roller in which said shaft is journaled during the formation of the roller.

An additional object of my invention is the provision of a method of the aforementioned character wherein the shaft is coated with an appropriate separating material prior to the location of the shaft in the die, said separating material being either meltable or vaporizable at lower than sintering temperatures and serving to isolate the charge of powdered metal encompassing the shaft when said shaft is located in the die to provide a clearance space between the roller body and the periphery of said shaft so free rotation of the roller body upon said shaft may be accomplished. After the charge of powdered metal has been deposited about the coated shaft and formed into roller form in the die, the powdered metal is subjected to temperatures which sinter it and which melt or vaporize the separating coating on the shaft to provide the necessary clearance space between the periphery of the shaft and the powdered metal roller body.

Other objects and advantages of my invention will be apparent from the following specification and the accompanying drawing which is for the purpose of illustration only and in which:

Fig. 1 is a top plan view of a sintered powdered metal roller constructed in accordance with the teachings of my invention;

Fig. 2 is a vertical sectional view taken on the broken line 2—2 of Fig. 1;

Fig. 3 is an elevational view showing the shaft incorporated in the powdered metal roller of Fig. 1;

Fig. 4 is a vertical sectional view showing the manner in which the sintered powdered metal roller of Fig. 1 is formed about its associated shaft in a die;

Fig. 5 is a vertical sectional view of an alternative embodiment of the powdered metal roller of my invention;

Fig. 6 is an elevational view of the shaft incorporated in the powdered metal roller of Fig. 5;

Fig. 7 is another embodiment of the powdered metal roller of my invention; and

Fig. 8 is an elevational view of the mounting shaft incorporated in the roller of Fig. 7.

Referring to the drawing and particularly to Figs. 1–3 thereof, I show a powdered metal roller 10 constructed in accordance with my invention and including a sintered powdered metal roller body 12 having a tread 14 formed upon the periphery thereof for engagement with a surface to which the roller body 12 is juxtaposed. Formed centrally of the body 12 is a bore 16 for the reception of a roller body mounting shaft 18. The extremity of the shaft 18 which protrudes beyond the roller body 12 incorporates a bore 20 the wall of which may be spun or staked down to attach the shaft 18 and the roller body 12 to a suitable mounting means.

The shaft 18, as best shown in Figs. 2 and 3 of the drawing, has an enlarged head portion 22 formed upon one extremity thereof, said head portion terminating in a conical thrust bearing surface 44 and having provided intermediate its ends an annular thrust bearing surface 26. The end of the centrally located bore 16 in the roller body 12 provides a frusto-conical recess 28 engageable with the frusto-conical thrust bearing surface 24 of the head 22 on the mounting shaft 18 and an annular thrust bearing ring 30 is formed integrally with the wall of the bore 16 and projects inwardly into the annular thrust bearing surface or groove 26 provided intermediate the ends of the shaft 18 and, more particularly, the head 22 thereupon.

It is, therefore, readily apparent that when the roller body 12 is oriented in a vertical plane, radial loads imposed upon the roller body 12 will be sustained upon the radial bearing surfaces on the head 22 on opposite sides of the thrust bearing surface or groove 26. However, when the roller body 12 is subjected to axial loads, they will be sustained by the cooperative relationship between the conical thrust bearing surface 24 on the end of the head 22 and the conical recess 28 at the end of the bore 16 and the co-operative relationship between the thrust surface or groove 26 in the head 22 and the thrust bearing ring 30 provided in the wall of the bore 16 in the body 12.

The manner in which the roller 10 is fabricated is diagrammatically illustrated in Fig. 4 of the drawing wherein is shown a die 34 constituted by die sections 36 and 38 having appropriately configured cavities 40 and 42, respectively, for imparting the desired configuration to a charge of powdered metal which is deposited in said cavities. The die section 36 is a female die section, while the die section 38 is a male die section which is movable into the female die section to compress the charge of powdered metal deposited therein.

It will be noted that the male die section 38 is provided with a centrally located bore 44 through which the shaft 18 is inserted by appropriate means to locate it centrally of the charge of powdered metal in the die cavities. Subsequently to the insertion of the shaft 18 and the deposition of the charge of powdered metal in the aforementioned cavities in the dies 36 and 38, the die 38 is moved into the die 36 under pressure to compress the charge of powdered metal to the desired extent and to impart the desired configuration and dimensions to the roller body 12.

When the charge of powdered metal is so compressed, the bore 16 is formed and the end and walls of the bore 16 assume the configuration of the head 22 of the shaft 18 to provide the frusto-conical recess 28 at the end of the bore adjacent the frusto-conical thrust bearing surface 24 and the annular bearing ring 30 adjacent the annular thrust bearing surface or groove 26. Therefore, the shaft and, more particularly, the head 22 thereof serves as a matrix for the formation of the co-operative bearing surfaces 28 and 32 on the wall and at the end of the bore 16.

If the roller body 12 is formed about the head 22 of the shaft 18 with the charge of powdered metal in direct contact with the periphery of the head 22 of the shaft 18, the resultant product will be constituted by a shaft 18 which is fixedly located in the bore 16 and relative rotation between the shaft 18 and the roller body 12 cannot be accomplished without a prolonged running-in period which will cause enough wear between the bore 16 and the shaft 18 to permit relative rotation therebetween.

In order to eliminate this undesirable contingency, I deposit an isolating or separating coating 46 on the exterior of the shaft 18, as best shown in Fig. 3 of the drawing, said isolating coating serving to provide a space between the charge of powdered metal in the die and the periphery of the shaft 18. Suitable isolating coatings include molybdenum-disulfide lubricant in which the shaft 18 is dipped prior to its deposition in the die 34. In addition, a very light plate of suitable metal of approximately one-half thousandth to one ten-thousandth of an inch can be utilized, the shaft 18 being plated prior to its deposition in the die 34. It is also feasible to utilize lacquer coatings of various types on the shaft 18. Therefore, when the charge of powdered metal is compressed into the form of the roller body 12 about the shaft 18, the isolating or separating coating 46 will prevent the direct impingement of the powdered metal upon the periphery of the shaft 18.

The roller body 12 is subsequently sintered at elevated temperatures whose range depends upon the powdered metal which is utilized in forming the roller body; where powdered bronze is used, a temperature of 1500° F. is adequate, for brass 1650° F. can be utilized, for copper 1900° F., and for iron and steel alloys a range of 2000° F. to 2600° F. may be utilized.

During the sintering process, the isolating coating 46 is either vaporized or melted to create a space 48, as best shown in Fig. 2 of the drawing, between the periphery of the head 22 of the shaft 18 and the interior and end of the bore 16. Thus, when the roller 10 is removed from the sintering furnace, free rotation between the roller body 12 and the shaft 18 is possible without the necessity for running-in the roller body 12 upon the shaft 18. Since the thickness of the isolating or separating coating on the shaft 18 may be controlled to accurately determined limits, the amount of clearance between the roller body 12 and the shaft 18 is very slight and, of course, all end play between the roller body 12 and the shaft 18 is substantially eliminated by virtue of the co-operative thrust bearing surfaces provided on the periphery of the shaft 18 and in the bore 16 of the roller body 12.

I have found that a desirable composition of powdered metal for forming the charge of the roller body 12 includes a mixture of 92% iron powder, 7% copper powder, and 1% carbon. The carbon content can vary from zero to 1½%, the copper content from zero to 15%. Suitable sintering temperatures for the mixtures vary between 1560° F. to 2400° F.

After the completion of the sintering process, it is desirable to heat treat the roller 10 to eliminate any stresses to which the materials of the roller body 12 or the shaft 18 may have been subjected during the sintering process. After the completion of the sintering process, the roller body 12 may be deposited in a tank of heated lubricant of the desired quality for impregnating the porous metal roller body 12 with lubricant. By the impregnation of the sintered powdered metal body 12 of the roller 10 with lubricant, many of the lubricating problems frequently encountered with conventional rollers and assemblies are eliminated since the need for frequent lubrication of the roller 10 is eliminated.

An alternative embodiment of the roller of my invention is shown in Figs. 5 and 6 and includes a roller body 50 having a peripheral tread 52 and a through-bore 54 formed therein. The roller body 50 is, of course, formed from sintered powdered metal. The through-bore 54 terminates in a recess 56 in one side of the roller body 52 and a mounting shaft 58 is located in said through-bore. A head 60 is defined upon one extremity of said shaft and includes an annular groove or thrust bearing surface 62 which is engaged by a thrust bearing ring 64 formed in the wall of the bore 54.

A portion of the head 60 protrudes into the recess 56 in the side of the body 50. The fabrication and mode of operation of the embodiment of the invention shown in Figs. 5 and 6 of the drawing is identical with that shown in Figs. 1–4, with the exception that there is not provided upon the head 60 the conical thrust bearing surface 24 and mating conical surface 28 in the end of the bore 16.

The embodiment shown in Figs. 7 and 8 of the drawing is substantially identical to that of Figs. 5 and 6 of the drawing, with the exception that a shaft 66 is provided which has a plurality of thrust bearing annular ridges 68 formed thereupon engageable by similarly formed thrust bearing rings 70 in the wall of the bore 54.

I thus provide by my construction a roller which includes a sintered powdered metal roller body having a mounted shaft permanently secured therein, said roller being characterized by the fact that it will absorb both radial and thrust loads and eliminates lubricating problems encountered in conventional rollers.

I claim as my invention:

In a roller construction, the combination of: a shaft of cylindrical cross section having a first thrust bearing formed intermediate the ends thereof and a conical thrust bearing formed upon one end thereof; and a roller formed from sintered powdered metal having a wall defining a centrally located receptacle provided with a conical bottom portion conforming to the configuration of said second thrust bearing and having an annular projection formed thereupon engageable with said first thrust bearing on said shaft.

References Cited in the file of this patent

UNITED STATES PATENTS

| | | |
|---|---|---|
| 2,351,909 | Beretish | June 20, 1944 |
| 2,669,491 | Haller | Feb. 16, 1954 |
| 2,695,230 | Haller | Nov. 23, 1954 |
| 2,695,231 | Causley | Nov. 23, 1954 |

FOREIGN PATENTS

| | | |
|---|---|---|
| 524,048 | Great Britain | July 29, 1940 |